United States Patent [19]
Forbes, Jr.

[11] 3,710,277
[45] Jan. 9, 1973

[54] LIGHT PUMPED LASER

[75] Inventor: Dewey C. Forbes, Jr., Belmont, Mass.

[73] Assignee: Xenon Corporation, Medford, Mass.

[22] Filed: Feb. 17, 1970

[21] Appl. No.: 12,099

[52] U.S. Cl. ................................................. 331/94.5
[51] Int. Cl. ...................................................... H01s 3/09
[58] Field of Search ................ 33/94.5; 350/294, 285

[56] References Cited

UNITED STATES PATENTS

| | | |
|---|---|---|
| 3,230,474 | 1/1966 | Keck et al. ............................ 331/94.5 |
| 3,477,036 | 11/1969 | Haisma ................................ 331/94.5 |
| 3,443,243 | 5/1969 | Patel .................................... 331/94.5 |
| 1,988,946 | 1/1935 | Hauser et al. ......................... 350/285 |
| 3,535,016 | 10/1970 | Malifaud ................................ 350/96 |

*Primary Examiner*—William L. Sikes
*Attorney*—Thomas N. Tarrant

[57] ABSTRACT

A light-pumped dye Laser having input and output paths parallel and the input radiation deflected into the cavity at an angle less than 90°, the sides of the cavity being reflective and inclined so that the input radiation travels by repeated reflections along the cavity without reaching the end.

5 Claims, 4 Drawing Figures

C. Forbes Dewey, Jr.
*Inventor*
By Thomas N. Tarrant
*Attorney*

C. Forbes Dewey, Jr.
*Inventor*
By Thomas N. Tarnow
*Attorney*

LIGHT PUMPED LASER

BACKGROUND OF THE INVENTION

1. Field of the Invention

Dye LASERS energized by a pulsed light source in which the energizing light is introduced through a side wall of the optical cavity.

2. History of the Invention

LASERS, particularly light-pumped LASERS are notoriously inefficient. Many fanciful ideas have been utilized to improve the effective transfer of energy from the pump source to the Lasing medium. Flash lamps shaped as helices have been used, flash lamps built into the walls of the optical cavity have also been used and much effort expended in matching refractive indices to ensure the greatest possible transfer of light into the cavity. While in some devices the energizing light has been introduced through an end reflector of the optical cavity, the most common and simple arrangements have introduced the energizing light through a sidewall. (see Bradley et al., IEEE J. of Quantum Electronics, Vol. QE-4 No. 11, Nov. 1968 p. 707 et seq.) The introduction of energizing light through a sidewall usually leads to asymmetrical pumping as well as substantial variations in energy transfer dependent upon the absorption characteristics of the LASER medium. A symmetrical pumping produces a nonsymmetrical output beam. Particularly in the dye LASER, the lasing action with a fixed energy input will vary considerably with density and type of dye as a result of variation in energy transfer. A common source of pumping for a dye LASER is another LASER such as a ruby LASER. The value of the dye LASER is in its ability to tune the output wavelength over a much larger region of the electromagnetic spectrum than available from other LASERS. This justifies the low efficiency inherent in using one LASER to pump another. In fact, however, the use of a LASER pump is almost essential for pumping many dyes. Lasing action for many dyes requires that the pump energy be transferred within less than 200 nano seconds. Longer pump pulse periods for many dyes have been found to lead to self-quenching of lasing action and undesirable thermal refraction effects. By using a Ruby or other more conventional LASER for pumping, often in conjunction with a Q-switching arrangement, the primary input energy can be condensed in time into a pump pulse well below 200 nano seconds. A complication associated with LASER pumped LASERS is the extraction of the final LASER output beam from the optical cavity. This problem is simplified if the input beam is parallel with the axis of the output. Inputs that are coaxial with the output have been used. These however have severe limitations on the cavity end reflectors and have additional spectral requirements when adapted by means of the usual dichroic filters.

SUMMARY OF THE INVENTION

In accordance with the present invention a dye LASER cavity is made with opposing walls reflective and nonparallel. A window is provided in the reflective coating near one end for admission of pump light. The walls converge toward the opposite end so that pump light entering transversely at an angle less than the perpendicular travels down the cavity by multiple reflections. The convergence of the walls causes the angles of reflection to successively decrease to zero at which point the light starts back up the cavity. This repeated reflection in the cavity improves the energy transfer and reduces the effect of dye absorption characteristics. It also balances out the energy transferred through the cross section of the LASER cell to produce a more nearly symmetrical LASER beam. The pump light is introduced through the window in the side wall of the cavity by reflection from a path parallel with the cavity axis. A prism or mirror adjacent to the cavity is used for this purpose. Thus it is an object of the invention to provide a novel dye LASER.

It is a further object of the invention to provide a LASER in which pump light is trapped in the LASER cavity by multiple reflections.

It is a further object of the invention to provide a LASER in which the pump light is received parallel with the axis of the LASER cavity and is deflected into the cavity through a window in a sidewall of the cavity.

It is still a further object of the invention to provide a LASER cavity having four sidewalls, two of which are reflectively coated and converge toward one end of the cavity.

Further objects and features of the invention will become apparent on reading the following description together with the drawing.

DESCRIPTION OF THE PREFERRED EMBODIMENT

Figure 1:
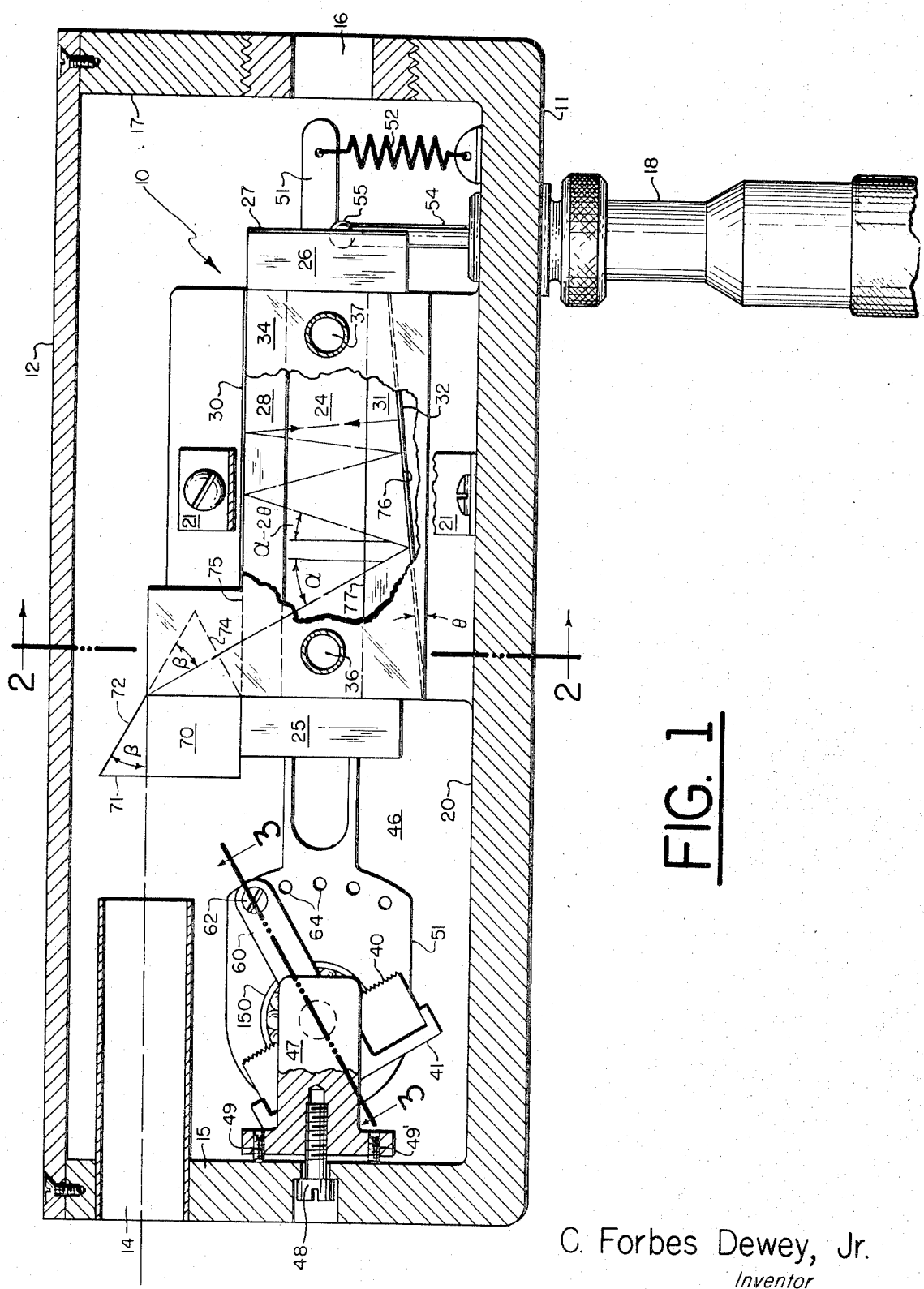
FIG. 1 is a plan view of the inventive LASER partially in section.

In a preferred embodiment, the inventive LASER cell as depicted in FIG. 1 is mounted as a tunable dye LASER. LASER cell 10 is mounted in housing 11 of rectangular cross-section. The housing material is not critical and can be made of metal or plastic designed to provide structural strength and dimensional stability. Housing 11 has a cover plate 12 suitably attached with screws to permit access. Housing 11 also has first aperture 14 in first end wall 15 of housing 11 for the entrance of pumping light and second aperture 16 in second end wall 17 of housing 11 for the LASER output beam. Micrometer-type fine tuning control 18 is mounted through sidewall 20 of housing 11.

LASER cell 10 is depicted as secured to wall 20 of housing 11 by mounting bracket 21. While the inventive concepts are applicable to solid and gas LASERS, they have been found to be of particular value in liquid dye LASERS. Gas Lasers are more commonly pumped with energy other than light. Solid LASERS cannot be varied in their light absorptive characteristics so that variations in energy coupling to exposed units of active medium are not a problem. Thus LASER cell 10 is depicted as a liquid LASER cell having a central longitudinal cavity 24 bounded by six pieces of fused silica. Fused silica is hereinafter referred to as quartz and is preferred because of its high and uniform transparency over the visible spectrum as well as its dimensional stability. End piece 25 at a first end of cavity 24 is transparent. End piece 26 at the opposite end of cavity 24 faces output aperture 16. End piece 26 has reflective coating 27 on its outer surface. Reflective coating 27 is partially transmissive and has 40 to 90 percent reflectivity for liquid dye LASERS. For the particular dye solutions tested, a reflectivity near 40 percent has produced good lasing action.

The sides of cavity 24 are bounded by flat piece 28 having reflective coating 30 ≥ 99 percent reflectivity and tapered piece 31 having reflective coating 32 ≥ 99 percent reflectivity. The reflective coatings have all been used on the exterior surfaces to avoid deleterious effects from contact with the dye solutions. Top piece 34 and bottom piece 35 are flat transparent pieces illustrated in FIG. 2. Transparency of pieces 34 and 35 is for visual access and is not essential to operation of the dye LASER. It has been found expedient to grind the outer surfaces of pieces 34 and 35 to avoid forming a LASER cavity mode perpendicular to the desired cavity axis. Top piece 34 has two apertures 36 and 37 to which are connected tubes 38 for adding and draining dye solution. The two tubes permit continuous circulation for dye solutions that become nonresponsive with repeated pumping.

Figure 3:
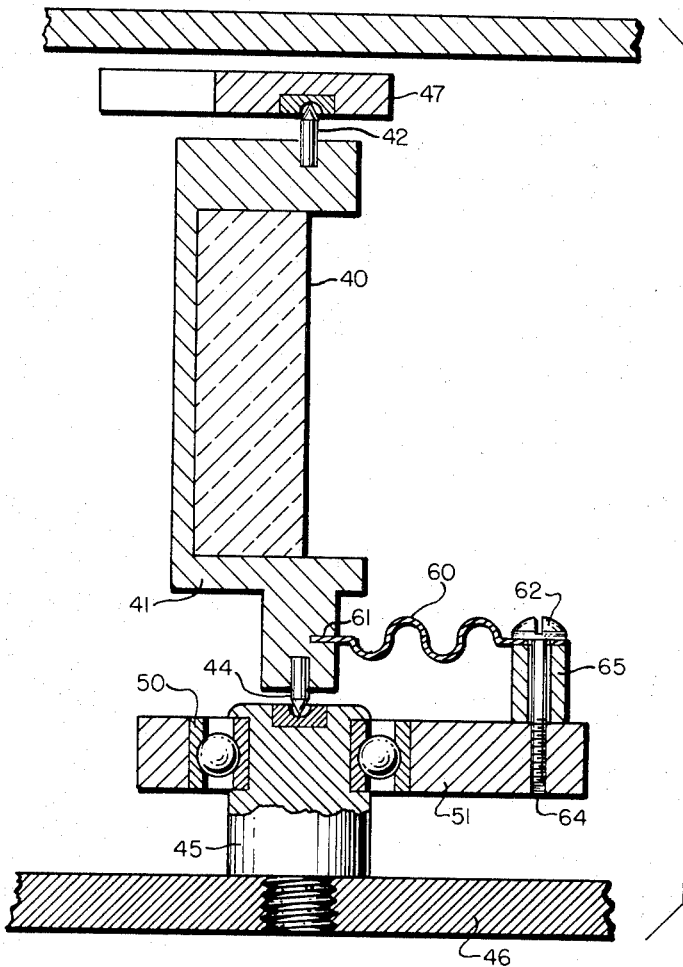
FIG. 3 is a sectional view through section 3—3 of FIG. 1.

The optical cavity of the LASER is bounded by reflective coating 27 at the output end and by diffraction grating 40 facing end piece 25 at the other end. Diffraction grating 40 is mounted in bracket 41 which in turn is supported by top and bottom needle bearings 42 and 44 depicted in FIG. 3. Needle bearing 44 bears against stud 45 secured in bottom wall 46 of housing 11. Needle bearing 42 bears against support 47 which is secured to end wall 15 of housing 11 by machine screw 48 (FIG. 1). Two set screws 49 and 49' provide locating adjustment of needle bearing 42 for accurate vertical alignment.

Ball bearing race 50 pressure fitted on stud 45 supports tuning arm 51 for rotating grating 40. Tuning arm 51 extends below LASER cell 10 for substantially the interior length of housing 11. Near end wall 17, tuning arm 51 is tensioned toward side wall 20 by spring 52. Near spring 52, movable pin 54 of fine tuning control 18 bears against arm 51 by means of ball bearing 55. Ball bearing 55 rides in a spherical recess (not shown) at the end of pin 54 and a Vee-groove (see FIG. 2) in arm 51 to minimize friction. Spring 52 holds arm 51 firmly in contact with bearing 55 and pin 54.

Thus the bearing supports of grating 40 and tuning arm 51 are independent and additional coupling means is required between the two. Since the independent bearing supports avoid loading of the grating assembly by the tuning mechanism, the coupling means must give positive rotational control of grating 40 with the least possible vertical coupling that would add load on needle bearings 42 and 44. Accordingly, the coupling is provided by flat spring member 60 having accordian folds to give maximum flexibility in longitudinal and vertical directions. Spring member 60 is relatively wide in the horizontal dimension to provide rigid rotational coupling between arm 51 and grating 40.

Spring member 60 is suitably secured at one end to grating 40 by cementing or clamping in slot 61 of mounting bracket 41. The other end is conveniently secured to arm 51 by machine screw 62 which may be screwed into any one of a plurality of threaded holes 64 so as to provide a coarse tuning adjustment. Bushing 65 around screw 62 between arm 51 and member 60 keeps member 60 substantially parallel with arm 51.

In order to receive pump light along an axis parallel with cavity 24 and direct it transversely into cavity 24, prism 70 is mounted adjacent to side piece 28 positioned to receive light entering through aperture 14. As depicted, face 71 of prism 70 is normal to properly aligned incoming light. The "roof" 72 of prism 70 is slanted toward cavity 24 so as to form an angle "$\beta$" with the incident light. Exit surface 74 of prism 70 faces "window" 75 in side piece 28. Window 75 is an aperture in reflective coating 30. Preferably this aperture as well as surfaces 71 and 74 of prism 70 have antireflection coatings to permit maximum light transmission. The surfaces 76 and 77 of sidepiece 31 are not parallel. In the embodiment depicted the inside surface 77 is parallel with the axis of cavity 24 while outside surface 76 forms an angle $\theta$ with respect to a parallel of the axis of cavity 24.

The angles $\beta$ and $\theta$ are selected so that light entering prism 70 at face 71 will "walk" by multiple reflections down cavity 24 toward end piece 26 and back. In selecting these angles it is preferable that the light in its path of multiple reflections should not reach end piece 26 but it should have more than two reflections before reversing direction so as to distribute the energy through a substantial portion of the cell medium.

Prism 70 can be replaced by a mirror positioned as prism roof 72.

In operation, cavity 24 is filled with a liquid sensitized by suitable dyes for lasing action. Pumping light is supplied from an external source, for example a ruby or neodynium LASER. The pump light is reflected from prism roof 72 at an angle $\beta$ and passes through cavity 24 at an angle $\alpha$ relative to a normal with the axis of cavity 24. The light is reflected by coating 32 of side piece 31 and passes back through cavity 24 at an angle $\alpha - 2\theta$ with a normal from the cavity axis. With each reflection from coating 32 these angles become smaller until they go negative and the direction of the light travel reverses. The lasing frequency is coarse and fine tuned by rotating grating 40 using holes 64 and micrometer adjustment 18 respectively.

EXAMPLE

LASER Cell 10 was made of six pieces of quartz bonded together by epoxy resin. Mirror coating 27 was made 40 percent reflective. Diffraction grating 40 was an aluminum coated replica grating of 600 lines/mm blazed for a first order at one micron.

Cavity 24 was filled with DTTC (3,3'-diethylthiatricarbocyanine iodide) dye in dimethyl sulfoxide with a concentration passing 10 percent of incoming 6943 A light in a path length of 2.5 inches. The optical cavity (between grating 40 and reflective coating 27) was 5 inches long. Cavity 24 was 2.5 inches long.

Angle $\beta$ was 30°
Angle $\theta$ was 5°
Pumping with a Q-switched ruby LASER with an output power of about 0.1 joules in about 20 nano seconds, intense tunable LASER light was produced in the range of 8200 A to 8300 A with an output wavelength bandwidth of approximately 10 A.

Figure 2:
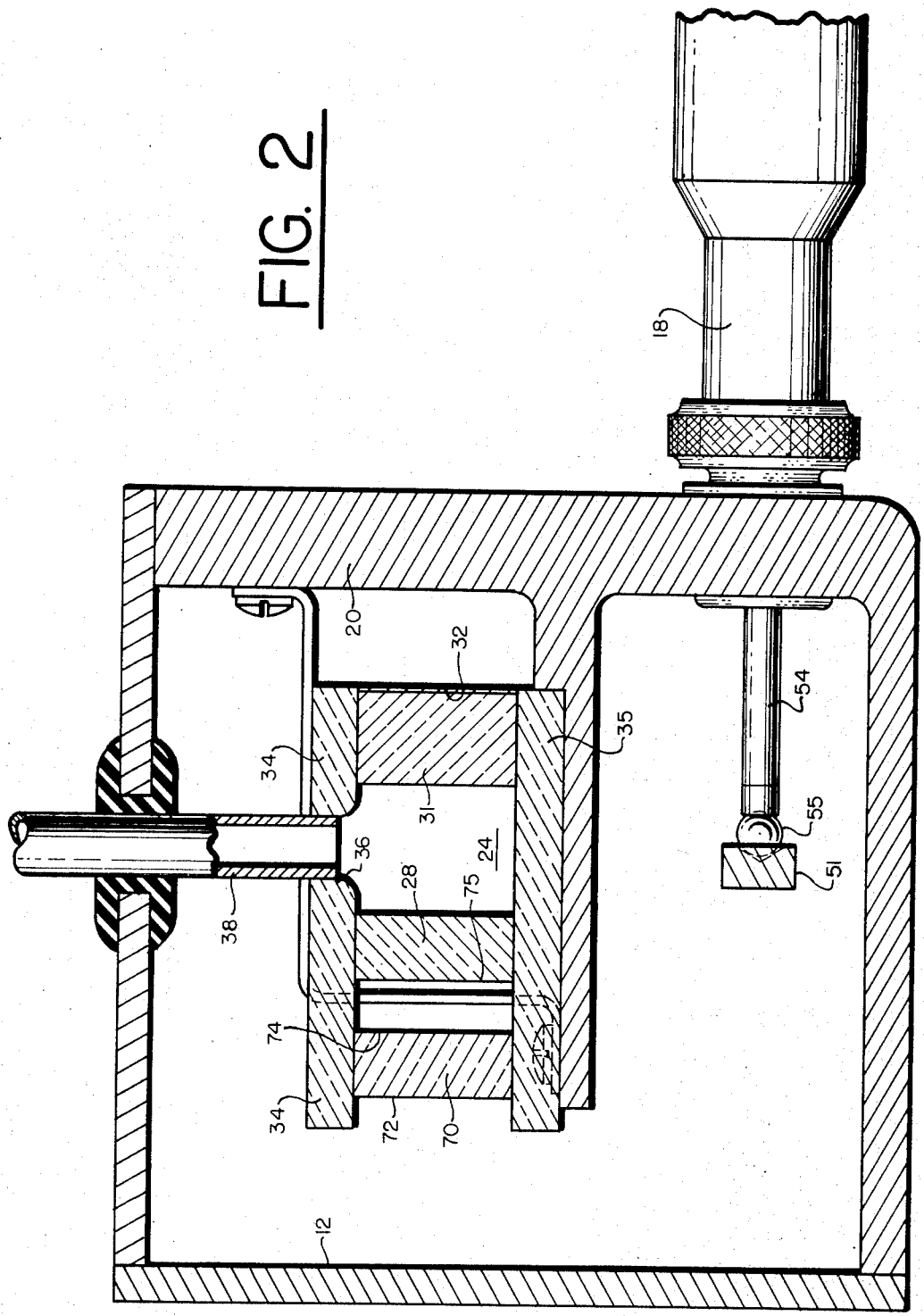
FIG. 2 is a sectional view through section 2—2 of FIG. 1.
Figure 4:
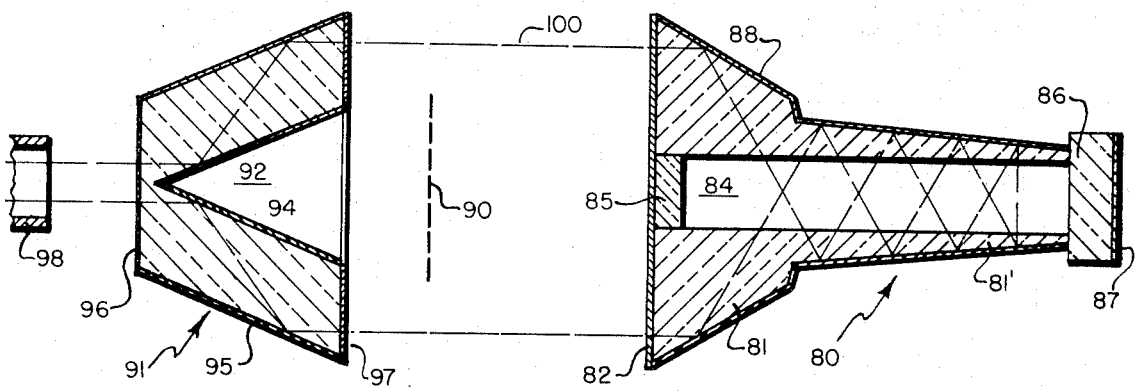
FIG. 4 is a sectional view of an alternative LASER cell and optical input arrangement.

As depicted in FIG. 4, the LASER cell of FIGS. 1 and 2 can be replaced with a cell that is completely symmetrical around its longitudinal axis. Cell 80 is made in the form of a double truncated cone with a cylindrical bore 84. The outside of the cone in the section nearest the apex has a tapered (i.e. 2.5° relative to said axis) reflective surface 81' for trapping light by multiple reflections as in the case of FIG. 1. The outside of the cone in the section nearest the base is substantially greater in diameter and has a tapered (i.e. 30° relative to said axis) reflective surface 81. Base 82 of the double truncated cone is a polished flat preferably antireflectively coated.

The respective lengths and taper angles of the two conical sections are selected to intercept an annulus of light at base 82, and deflect it by the reflective surface 81 across said bore to the reflective surface 81' and thence trap it by multiple reflections of diminishing angle. The bore at the large end of cell 80 is capped by a transparent plate 85. The small end of cell 80 is terminated by an end plate 86 having a partially transmissive reflective coating 87.

Cell 80 can be made of quartz or other highly transparent material with good dimensional stability. A diffraction grating or other frequency selective reflector 90 is positioned facing plate 85 in similar fashion to grating 40 of FIG. 1.

Light aperture 98 is arranged to admit a beam of light from an external LASER, Xenon lamp or similar pulsed source along an axis in line with the axis of cavity 84.

Between aperture 98 and reflector 90 is circular periscopic light deflector 91 for dispersing an incoming beam of light into an annulus of light with a diameter large enough to pass around reflector 90 and be intercepted within the periphery of base 82. Reflector 91 is a truncated cone with its base facing LASER cell 10 and its apex facing aperture 98. Truncated cone 91 has a conical cavity 92 with reflectively coated walls 94. The conical taper of both cavity 92 and reflectively coated outer wall 95 of deflector 91 is suitably 22 ½° relative to the optical axis of the system. Both base 97 and apex 96 are preferably antireflection coated.

Operation is depicted by two rays 100 and 101 depicting the path of pump light entering the LASER system. These rays may be considered to approximate the outer rays of the incoming pump beam. Following ray 101; it enters parallel with the optical axis of the system through aperture 98, passes through the apex of deflector 91, and reflects from the reflectively coated cavity wall 94. Reflectively coated outer wall 95 reflects ray 101 back parallel with the optical axis of the system but at a much greater radial distance. Ray 101 then passes through base 97 and enters LASER cell 10 at base 82. Reflectively coated surface 81 reflects ray 101 into an across bore 84. Ray 101 is then multiply reflected between reflectively coated surface 81' at diminishing angles of reflection that reverse before reaching end mirror 86. This embodiment introduces pump light into the LASER cell with 360° radial symmetry. Interference from the mounts of reflector 90 can be negligible and thus disregarded provided the mounts are kept small in the light path.

While the invention has been described with respect to specific embodiments of a liquid dye LASER, it is readily applicable to many other types of LASERS. Many variations are also possible in the optical cavity without effecting the inventive concepts. For example, the diffraction grating described can be replaced with an echelle grating to reduce the width of the output spectrum to 1 A as described by Bradley et al. in the IEEE article referred to previously. U.S. Pat. No. 3,443,243 to Patel suggests still a further applicable arrangement in which a diffraction grating is used outside the primary optical cavity. Thus it is intended to cover the invention broadly within the spirit and scope of the appended claims.

I claim:

1. A light-pumped LASER device having an optical cavity defined by two reflective elements, a lasable liquid contained between said reflective elements and means to introduce pump light to said lasable liquid for stimulating laser activity in said cavity wherein the improvement comprises in combination:

a. A liquid LASER cell for containing said lasable liquid having an optical axis and comprising:
    1. A first flat wall parallel to said optical axis and externally reflectively coated except over a window area which would be illuminated by pump light impinging thereon said window area being parallel with said optical axis and located adjacent one end of said first wall;
    2. a second tapered wall opposite said first wall and having an external reflectively coated surface that converges toward said reflectively coated surface of said first wall along said optical axis; and,
  b. light deflecting means mounted adjacent to said first wall at said window area for receiving pump light arriving along an axis parallel to said optical axis and deflecting said pump light transversely through said LASER cell, said deflecting means being arranged to deflect pump light into said cell at an angle related to the angle at which the reflectively coated surface of said second wall converges whereby pump light entering said cell is multiply reflected between said first wall and said second wall at successively decreasing angles reaching zero and reversing before traveling the length of said cell.

2. A light-pumped LASER according to claim 1 in which said LASER cell comprises said first wall and said second wall, third and fourth walls perpendicular to said first and second walls, and two ends all enclosing a cavity for containing a lasable liquid dye solution.

3. A light-pumped LASER according to claim 2 in which each of said walls and said two ends are made of quartz.

4. A light-pumped LASER according to claim 2 wherein said LASER cell is positioned in an optical cavity bounded by a partially reflective surface on one of said two ends and by a rotatable diffraction grating positioned exterior to the other of said two ends along said optical axis.

5. A light-pumped LASER according to claim 1 wherein said light deflecting means is a prism.

* * * * *